US011257519B2

(12) United States Patent
Oberg et al.

(10) Patent No.: US 11,257,519 B2
(45) Date of Patent: *Feb. 22, 2022

(54) THERMAL COMPENSATION FOR HEAT ASSISTED MAGNETIC RECORDING

(71) Applicant: MARVELL ASIA PTE, LTD., Singapore (SG)

(72) Inventors: Mats Oberg, San Jose, CA (US); Hao Fang, Eden Prairie, MN (US)

(73) Assignee: MARVELL ASIA PTE, LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/143,569

(22) Filed: Jan. 7, 2021

(65) Prior Publication Data

US 2021/0125635 A1 Apr. 29, 2021

Related U.S. Application Data

(63) Continuation of application No. 16/667,480, filed on Oct. 29, 2019, now Pat. No. 10,896,694.

(60) Provisional application No. 62/752,890, filed on Oct. 30, 2018.

(51) Int. Cl.
*G11B 5/09* (2006.01)
*G11B 7/1267* (2012.01)
*G11B 5/00* (2006.01)

(52) U.S. Cl.
CPC .... *G11B 7/1267* (2013.01); *G11B 2005/0021* (2013.01)

(58) Field of Classification Search
None
See application file for complete search history.

(56) References Cited

U.S. PATENT DOCUMENTS

| 4,731,773 | A | * | 3/1988 | Lewkowicz | G11B 7/0045 369/59.11 |
| 5,553,043 | A | * | 9/1996 | Yamaguchi | G11B 20/1403 369/124.07 |
| 6,404,578 | B1 | * | 6/2002 | Bhandari | H03F 3/45098 360/61 |
| 8,537,644 | B2 | | 9/2013 | Lennard et al. | |
| 8,854,929 | B1 | | 10/2014 | Champion et al. | |
| 9,384,774 | B1 | | 7/2016 | Nookala et al. | |
| 10,896,694 | B2 | * | 1/2021 | Oberg | G11B 7/1267 |
| 2008/0013151 | A1 | | 1/2008 | Draper | |

(Continued)

OTHER PUBLICATIONS

Evans, "Heated Assisted Magnetic Recording", [online] retrieved on Sep. 22, 2019 from <www-users.york.ac.uk/~rfle500/research/heat-assisted-magnetic-recordings/>, 5 pages.

(Continued)

*Primary Examiner* — Peter Vincent Agustin

(57) ABSTRACT

A system includes a driver and a controller. The driver is configured to output a signal to a preamplifier of a heat source based on a thermal compensation value to cause the heat source to heat a spot on a storage medium. The controller is configured to adjust the thermal compensation value based on a duration for which the heat source is in an active or inactive operational state. The thermal compensation value is indicative of a history of durations that the heat source was in the active or inactive operational state.

20 Claims, 8 Drawing Sheets

(56) References Cited

U.S. PATENT DOCUMENTS

| 2009/0231746 | A1* | 9/2009 | Kaizu | G11B 5/743 |
| | | | | 360/59 |
| 2013/0077453 | A1 | 3/2013 | Alex | |
| 2020/0135233 | A1* | 4/2020 | Oberg | G11B 5/02 |
| 2021/0125635 | A1* | 4/2021 | Oberg | G11B 5/012 |

OTHER PUBLICATIONS

Kryder, et al., "Heat Assisted Magnetic Recording", Procedings of the IEEE, vol. 96, No. 11, Nov. 2008, 26 pages.

PCT Application Serial No. PCT/IB2019/001154, International Search Report, dated Jan. 23, 2020, 4 pages.

PCT Application Serial No. PCT/IB2019/001154, International Written Opinion, dated Jan. 23, 2020, 6 pages.

Schreck, et al., "Thermal Aspects and Static/Dynamic Protrusion Behaviros in Heated-Assisted Magnetic Recording", IEEE Transactions on Magnetics, 2014, 6 pages.

Wang, et al., "HAMR Writing Process Model Based Compensation of Laser Induced Transients", IEEE Transactions on Magnetics, 2016, 7 pages.

Wang, et al., "Modelling and Compensation for Laser Induced Transients to Improve HAMR Writing Quality", Asia-Pacific Magnetic Recording Conference 2016, Jul. 13-Jul. 15, 2016, Yonsei University, Korea, 2 pages.

\* cited by examiner

THERMAL COMPENSATION FOR HEAT ASSISTED MAGNETIC RECORDING

CROSS REFERENCE TO RELATED APPLICATION

This disclosure is a continuation of U.S. application Ser. No. 16/667,480, filed Oct. 29, 2019 (now U.S. Pat. No. 10,896,694), which claims the benefit of priority under 35 U.S.C. § 119(e) of U.S. Provisional Application Ser. No. 62/752,890 filed Oct. 30, 2018, entitled "Thermal Compensation for Laser in Heat Assisted Magnetic Recording". The entire disclosures of the applications referenced above are incorporated herein by reference.

FIELD OF USE

The disclosure generally relates to the field of device architecture and to storage control systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Heat Assisted Magnetic Recording (HAMR) uses a laser to temporarily heat a spot of magnetic media so that coercivity of the spot is reduced. A writer then applies a magnetic field to write data to the spot of the media and heating is stopped. After the spot cools, the coercivity increases and the media retains the data even if the writer applies additional magnetic fields to other heated spots of the media.

SUMMARY

Aspects of the disclosure provide a controller that controls a heat source for heat assisted magnetic recording, the controller comprising: a counter configured to measure a duration that the heat source which heats a spot on a storage medium is in an active or inactive operational state; a set of controller components configured to adjust a thermal compensation value based on the duration that the heat source is in the active or inactive operational state, the thermal compensation value indicative of a history of durations that the heat source was in the active or inactive operational state; and a driver configured to output a signal to a preamplifier of the heat source based on the thermal compensation value to cause the heat source to heat the spot on the storage medium.

In one example, the set of controller components is configured to adjust the set of controller components configured to adjust the thermal compensation value is further configured to determine whether an increment threshold or decrement threshold is satisfied by the duration measurement, and to increment, decrement, or not adjust the thermal compensation value based on indications of which of the thresholds is satisfied. In another example, a value of the increment threshold and decrement threshold are based on a frequency of a variable clock associated with a write position on the storage medium. In yet another example, a value of the increment threshold and decrement threshold are based on the thermal compensation value. In another example, the thermal compensation value indicates one of a power setting for the heat source and a current adjustment for the heat source. In yet another example, the set of controller components comprises a first register configured to store a specified number of most significant bits of the adjusted thermal compensation value as the signal. In another example, the counter is coupled to receive clock pulses from a clock in a read channel of a storage drive and the duration measurement is count of clock pulses, wherein restart of the measurement duration comprises resetting the clock pulse count. In yet another example, the set of controller components comprises: a first comparator coupled to the counter to receive the duration measurement as input and to receive an increment threshold as input, the first comparator configured to determine whether the increment threshold and the duration measurement are equal and to generate output indicating that the increment threshold is satisfied if equal to the measurement duration; and a second comparator to receive the duration measurement as input and to receive a decrement threshold as input, the second comparator configured to determine whether the decrement threshold and the duration measurement are equal and to generate output indicating that the decrement threshold is satisfied if equal to the measurement duration. In another example, the set of controller components comprises a first multiplexer to receive as input indications of which of the thresholds is satisfied, to receive a control signal indicating an activation state of the heat source, determine that the decrement threshold was satisfied if the control signal indicates the active operational state for the heat source, determine that the increment threshold was satisfied if the control signal indicates the inactive operational state for the heat source, and output an adjustment indication to increment, decrement, or not adjust the thermal compensation value based on the indications of which of the thresholds is satisfied. In yet another example, the set of controller components adjusts the thermal compensation value according to an adjustment indication of increment, decrement, or no adjustment. In another example, an absolute function component receives as input the adjustment indication, generate an absolute value of the adjustment indication, and couple the absolute value of the adjustment indication to a reset pin of the counter. In another example, the set of controller components is further configured to ensure the adjusted thermal compensation value does not exceed a ceiling. In yet another example, the set of controller components is configured to ensure the adjusted thermal compensation value does not exceed a floor.

Aspects of the disclosure provide a storage drive having a laser for heat assisted magnetic recording, the storage drive comprising: a laser preamplifier; a storage medium; a read channel having, a clock pulse counter configured to measure a duration that the laser which heats a spot on the storage medium is in an active or inactive operational state; a set of controller components configured to adjust a thermal compensation value based on the duration that the laser is in the active or inactive operational state, the thermal compensation value indicative of a history of durations that the laser was in the active or inactive operational state; and a channel driver coupled to output to the laser preamplifier a signal based on the thermal compensation value to drive the laser to heat the spot on the storage medium; and a write head configured to apply, while the spot is heated, a magnetic field to the heated spot to write data to the storage medium. In one example, the channel driver is coupled to the laser preamplifier via a set of one or more pins. In another example, the laser preamplifier comprises: a summer to add the signal from the channel driver with an indication of a steady state current for the laser; and a laser driver coupled to receive an output from the summer and to drive the laser based on the output from the summer. In yet another example, the laser preamplifier comprises: a table of power settings for the laser; a summer to add the signal from the channel driver and a second signal indicating a steady state power setting for a laser output; and a laser driver to drive the laser according to a power setting selected from the table of power settings based on an output from the summer.

Aspects of the disclosure provide a method of operating a storage drive that implements heat assisted magnetic recording, the method comprising: measuring a duration that a heat source which heats a spot on a storage medium is in an active or inactive operational state; adjust a thermal compensation value based on the duration that the heat source is in the active or inactive operational state, the thermal compensation value indicative of a history of durations that the heat source was in the active or inactive operational state; and outputting a signal to a preamplifier of the heat source based on the thermal compensation value to heat the spot on the storage medium. In one example, adjusting the thermal compensation value comprises determining whether a time-based increment threshold is satisfied when the heat source is off or whether a time-based decrement threshold is satisfied when the heat source is on; based on a determination that the time-based increment threshold is satisfied when the heat source is off, increasing the thermal compensation value; based on a determination that the time-based decrement threshold is satisfied when the heat source is on, decreasing the thermal compensation value; and the method further comprising modulating current to the heat source based on the thermal compensation value as increased or decreased. In another example, the method comprises applying a magnetic field indicative of data to be written to the spot on the storage medium while the spot is being heated.

BRIEF DESCRIPTION OF THE DRAWINGS

Aspects of the disclosure may be better understood by referencing the accompanying drawings.

DESCRIPTION

Figure 1:
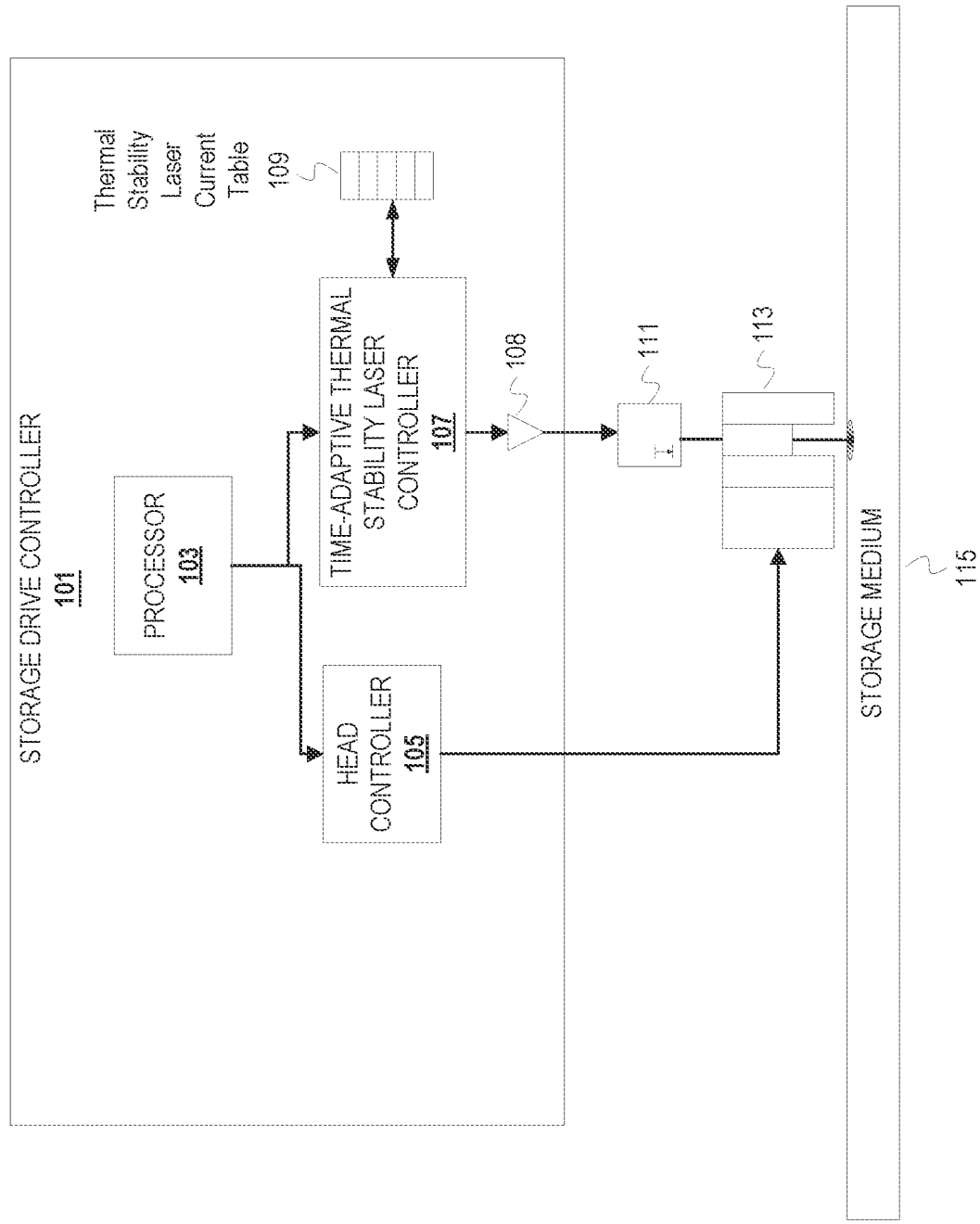
FIG. 1 depicts a diagram of selected components of a storage drive with a time-adaptive thermal stability laser controller.

The description that follows includes example systems, methods, techniques, and program flows that embody aspects of the disclosure. However, it is understood that this disclosure may be practiced without these specific details. For instance, this disclosure refers to a fixed clock in illustrative examples. Aspects of this disclosure can be also applied to variable clocks. In other instances, well-known instruction instances, protocols, structures and techniques have not been shown in detail in order not to obfuscate the description.

Overview

Heat Assisted Magnetic Recording (HAMR), also known as Thermally Assisted Magnetic Recording (TAMR), uses a laser to heat a spot of a magnetic data storage medium prior to data being written onto the media at the spot. As the laser is turned on, a laser beam from a laser diode goes through a waveguide and near-field transducer (NFT) and is focused onto the media at a spot. As the spot is heated, the coercivity of the media reduces enough that magnetization of the spot aligns to the direction of magnetic field from a writer and data is written to the media. When the laser is turned off, the spot cools and media coercivity returns to a high value. The magnetization will not be affected by the magnetic field from the writer and data is retained on the media. The size of the spot depends on the temperature of the laser diode, waveguide and NFT associated with the laser. The higher the temperature, the larger the spot. As the laser turns on from an off state, the laser diode and the waveguide and near-field transducer (NFT) will heat up over a period of time before reaching equilibrium. Thus, spot size for a restarted laser will be correspondingly smaller than the spot size when laser reaches stable temperature. Changes in spot size during the write operation can cause erasure of previously written data, i.e. on neighboring tracks, and can move location of transitions associated with the data. Ideally, spot size should be stable for all data written and independent of the amount of time the laser has been either on and heating, or off and cooling.

A storage drive controller is disclosed to variably control a thermal radiation or heat source (e.g., a laser) based on laser active or inactive durations that correspond to heating or cooling of the laser. A storage drive controller modulates current and/or power to the laser based on these active or inactive durations. While the laser is inactive, the storage drive controller increases a thermal compensation value indicative of past durations that the laser was in the active or inactive operational state. When the laser is active, the storage drive controller provides a current for driving the laser that is proportional to the thermal compensation value. The current causes the laser to quickly heat up to steady state in order to stabilize a spot size. As the laser continues being active and as data is written to the media, the storage drive controller decreases the thermal compensation value based on the heating of the laser. The storage drive controller provides a current for driving the laser which is proportional to the decreasing thermal compensation value so that variation in spot size is reduced as the data is written. When the laser is turned off and cooling, the storage drive controller again increases a thermal compensation value corresponding a duration that laser is inactive and cooling until a next time that data is written to the media. In this regard, the storage drive controller variably controls the heat source for HAMR based a history of active or inactive durations of the laser indicated by the thermal compensation value so that the heat source is thermally stable and the variation in spot size is reduced as the heat source is turned on and off during write operations.

Example Illustrations

FIG. 1 depicts a diagram of selected components of a storage drive with a time-adaptive thermal stability laser controller. FIG. 1 illustrates a storage drive controller 101, a laser 111, a data access head (e.g., write head) 113, and a storage medium 115. To maintain thermal stability throughout heat assisted magnetic recording, the storage drive controller 101 includes a time-adaptive thermal stability laser controller 107. The time-adaptive thermal stability laser controller 107 includes circuits, logic and/or programming to modulate power/current for driving the laser 111 for thermal stability of the laser, e.g., a laser diode, waveguide and near field transducer (NFT).

A processor 103 of the storage drive controller 101 communicates commands to both a head controller 105 and the time-adaptive thermal stability laser controller 107 according to write requests received by the processor 103. While the processor 103 directs the time-adaptive thermal stability laser controller 107 when to activate and de-activate the laser 111 for write requests, the time-adaptive thermal stability laser controller 107 controls the current that drives the laser for thermal stability. In order to minimize laser spot size differences over multiple write operations, the current that is applied to the laser 111 depends both upon the operational state of the laser (i.e., active or inactive) and upon the duration the laser has been in that state. The time-adaptive thermal stability laser controller 107 (hereinafter "thermal stability controller") tracks the state and duration and adjusts a thermal compensation value indicative of a history of durations that the laser was in the active or inactive operational state. With the thermal compensation value, the thermal stability controller 107 determines a corresponding current modifier and/or power level in a look up table (LUT) 109 associated with operating the laser 111. By applying the determined current modifier via a driver 108 to a normal operational current $I_{normal}$, the changes in spot size on the storage medium 115 can be minimized during write operations as the laser is turned off and on. In the case of the thermal stability controller 107 looking up a power level in the LUT 109, the thermal stability controller 107 would drive the laser 111 based on a current setting defined for the power level.

In some examples, the laser 111 may be replaced by any heat source capable of generating incident heating of a spot on the storage medium 115 sufficient to facilitate the write operations. Then any time-adaptive controller can be substituted for the time-adaptive thermal stability laser controller 107, such that the time-adaptive thermal stability controller 107 tracks active and inactive durations for the heating source. The time-adaptive controller may output a control signal based on a history of active and inactive durations of the heat source to control the heat source during the write operations.

Figure 2:
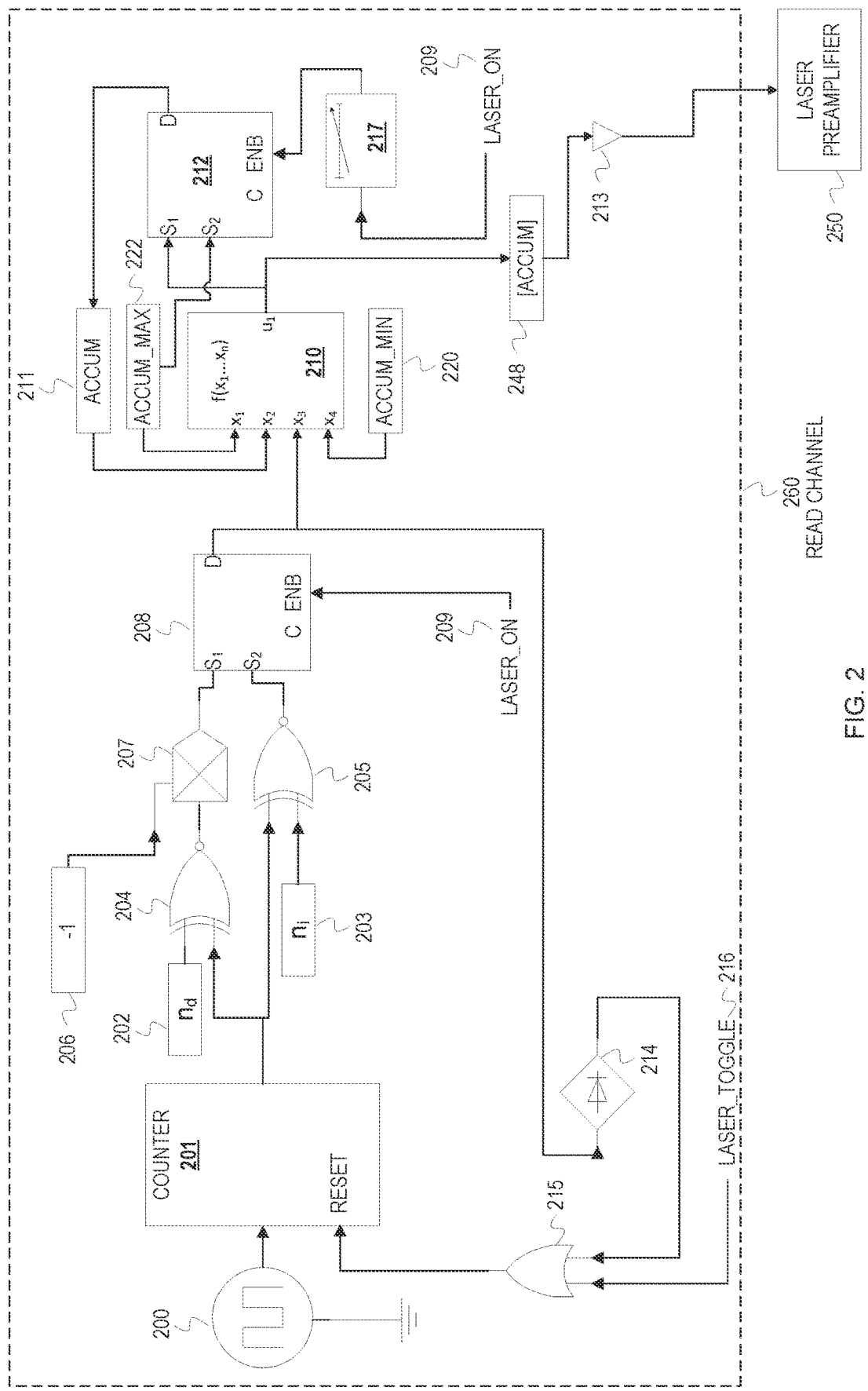
FIG. 2 is a diagram with components for an example time-adaptive thermal stability laser controller.

FIG. 2 is a diagram with components for an example time-adaptive thermal stability laser controller. In some examples, the components to control the laser for thermal stability may reside in a read channel 260 of a storage drive. FIG. 2 depicts selected components relevant to thermal stability and not all components that may be in a storage drive read channel. The illustrated read channel 260 includes a clock 200, a clock counter 201, a control path for triggering an increase or decrease in a thermal compensation value for either an active or inactive duration of the laser, and logic for adjusting the thermal compensation value according to output from the control path. In some examples, one or more components of the read channel 260 may be implemented as circuits. The thermal stability components of the read channel 260 indicate the thermal compensation value via a driver 213 to a laser preamplifier 250.

The control path to trigger an increase or decrease in the thermal compensation value may include a comparator 204, a comparator 205, a register 202, a register 203, and a multiplier 207. In this illustration, the registers 202, 203 have been programmed to store parameters $n_d$ and $n_i$, respectively. The parameters $n_d$ and $n_i$, are used as thresholds for triggering an adjustment of the thermal compensation value. The parameter $n_d$ is set to a threshold cooling duration or time the laser is inactive and the parameter $n_i$ is set to a threshold heating duration or time the laser is active.

The clock counter 201 generates a time-increasing count. For this illustration, the clock counter 201 runs off a fixed clock 200, but it can run off a variable clock(s). The clock counter 201 outputs a counter value (increasing count of clock pulses) to both comparators 204, 205. The logical comparator 204 compares the clock counter output against the decrement threshold $n_d$. When the clock counter output is equal to $n_d$, the comparator 204 outputs a positive signal which is negated. For example, the positive signal is input into the multiplier 207 which then multiplies the signal by a negative value found in a register 206 to create a negative impulse signal. The negative signal then travels to the multiplexer 208. The comparator 205 compares the clock counter output against the increment threshold $n_i$ found in the register 203. If they are equal, a positive signal is output by the comparator 205. This signal then travels to the multiplexer 208.

The multiplexer 208 selects between the output from the comparator 204 (after traversing the multiplier 207) and the comparator 205. A control signal 209 ("LASER_ON") that indicates whether the laser is on or off controls which input is selected by the multiplexer 208 for output. If the LASER_ON control signal 209 indicates that the laser is on, then the multiplexer 208 selects to output the negative value from the multiplier 207. Otherwise, the multiplexer 208 selects to output the value from the comparator 205. The multiplexer 208 is coupled to output to an arithmetic logic 210 and a full-wave rectifier 214.

The arithmetic logic 210 calculates an adjustment to a thermal compensation value ACCUM based on the input from the multiplexer 208. The adjustment to ACCUM is a reduction when the multiplexer 208 outputs the negative value from the multiplier 207 when the laser is on. The adjustment to ACCUM is an increase when the multiplexer 208 outputs the positive value from the comparator 205. In addition to the input from the multiplexer 208, the arithmetic logic 210 receives ACCUM from a register 211, ACCUM_MIN from a register 220, and ACCUM_MAX from a register 222. ACCUM is initially set be ACCUM_MAX. The ACCUM_MAX value is based on maximum current limits of the laser and storage drive configuration (i.e., distance between tracks, specific heat capacity). This maximum current value ($I_{max}$) may vary across different makes of storage drives. Although not necessary, firmware can be written to set the ACCUM_MAX to be based on $I_{max}$ for the laser with addition of a "priming buffer" to delay modulation after startup of the laser (e.g., ACCUM_MAX=$I_{max}$+0.5). The priming buffer can be a predetermined value chosen by a designer/programmer based on knowledge of the drive components. The ACCUM_MIN value may be based on a minimum current value ($I_{max}$) for effectively driving the laser for thermally assisted recording. The arithmetic logic 210 either increases or decreases ACCUM based on the multiplexer 208 output. After adjusting ACCUM, the arithmetic logic 210 then determines MAX(MIN(ACCUM, ACCUM_MAX), ACCUM_MIN) as output. This logic ensures ACCUM remains within the boundaries defined by ACCUM_MIN and ACCUM_MAX, and correspondingly ensures the laser is not driven with an inappropriate current.

The arithmetic logic 210 outputs the value from the MAX(MIN(ACCUM, ACCUM_MAX), ACCUM_MIN) logic to a multiplexer 212 and a driver 213. The multiplexer 212 selects between the output from the arithmetic logic 210 and the ACCUM_MAX register value 222 to store in the ACCUM register 211 based on the control signal received from an off-delay timer 217 fed by the LASER_ON signal 209. If the laser is off continuously for a predefined "long time" (e.g., 3 seconds), the off-delay timer 217 outputs a signal to multiplexer 212 which then resets the ACCUM register 211 value to ACCUM_MAX using register 222. This ensures that the ACCUM register 211 has a value for initial startup and whenever power is lost and restored.

The output from the multiplexer 208 also travels to a full-wave rectifier 214. The full wave rectifier 214 implements an absolute value function, generating positive signals for either positive or negative inputs from the multiplexer 208 which occur when either of the adjustment thresholds is satisfied. This absolute value function can be performed by another logic other than the full-wave rectifier shown here (e.g., a combination of op amps and diodes). The absolute value output by the full wave rectifier 214 travels to an OR logic gate 215 where it is joined with the LASER_TOGGLE signal 216. When either the laser is toggled (i.e. from on to off or from off to on) or a signal impulse is generated at the rectifier 214, a signal passes into the reset port of the clock counter 201 and resets the count. In this way, the counter 201 is reset whenever the laser changes states or the thermal compensation value is adjusted.

The bits or signals corresponding to the LASER_TOGGLE signal/value 216 and the LASER_ON signal/value 209 can be set and communicated by the processor of the storage drive or a laser controller. For instance, a laser controller can include a register that stores a value indicating whether a laser is on or off. At startup, this register is set to 0 (or whatever value is chosen to represent the off state for the laser). When the laser controller receives a command to activate the laser, then the laser controller can assert a pin that communicates the LASER_TOGGLE signal 216 to OR gate 215. In addition, the laser controller can change the value indicating the state of the laser. When a clock pulse causes the counter 201 to increment, it also causes the value indicating state of the laser to be communicated to the multiplexer 208 and off-delay timer 217 as control signal 209.

The value output by the arithmetic logic 210 is communicated to a laser preamplifier 250 via the driver 213. The arithmetic logic 210 is coupled to a register 248 to store the output ACCUM rounded to a nearest integer. The arithmetic logic 210 can be configured to output ACCUM to the multiplexer 212 and output the n most significant bits (MSBs) of ACCUM to the register 248. Embodiments can use a shifter as an intervening component between the arithmetic logic 210 and the register 248. The shifter can shift out the m least significant bits (LSBs) and output the remaining n MSBs to the register 248. In some embodiments, the laser preamplifier 250 will modulate current to the laser based on the analog signal from the driver 213 that is based on the output from the arithmetic logic 210. In some embodiments, the laser preamplifier 250 will select a power or current level to drive the laser based on the signal from the driver 213.

In examples, the thermal compensation value indicated by the accumulation counter functions as a recent time history of durations that the laser was active and heating or inactive and cooling. By tracking the recent time history, the storage drive controller may drive the laser so that the laser is thermally stable and spot size variation on the storage medium during write operations is reduced. Clock counter is used to track inactive and active durations of the laser corresponding to heating and cooling of the laser. Output of the clock counter is compared to $n_i$, the increment threshold and $n_d$, the decrement threshold. When the counter is equal to $n_i$, a positive signal generated. When the counter is equal to $n_d$ a positive signal is generated and then negated to generate a negative signal. If the laser, or another heat source, is on, the negative signal is selected. If the laser, or another heat source, is off, the positive signal is selected. The selected signal is added to the accumulation counter to adjust the thermal compensation value for the recent time history of durations that the laser was active and heating or inactive and cooling. A current proportional to the thermal compensation value is then output to the laser to maintain thermal stability of the laser and as a result reduce variation in laser spot size on the storage medium during write operations.

Figure 3:
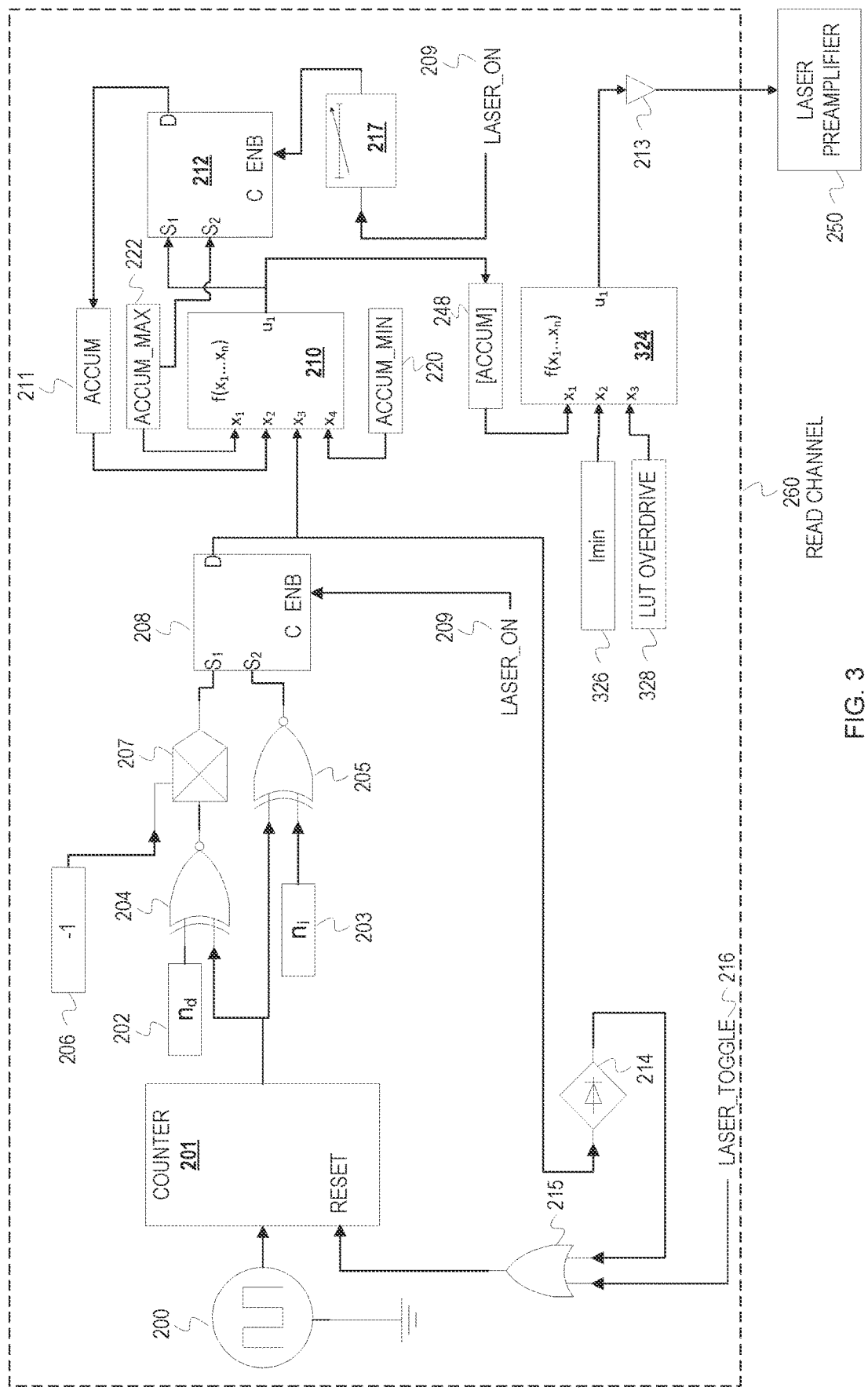
FIG. 3 illustrates a thermal stability controller as shown in FIG. 2 with additional components to output a laser drive current rather than a thermal compensation value.

FIG. 3 illustrates a thermal stability controller as shown in FIG. 2 with additional components to output a laser drive current rather than a thermal compensation value. In some examples, one or more components may be implemented as circuits. The calculations that convert the rounded thermal compensation value ACCUM provided from the register 248 into a current value OVERDRIVE are performed at additional logic 324. In this illustration, the output of arithmetic logic 210 feeds into an additional logical 324. Here the value of ACCUM is converted into output current OVERDRIVE that flows into driver 213 and then into the laser preamplifier 250. One possible implementation of this logic 324 produces OVERDRIVE=$I_{min}$+floor(ACCUM) where $I_{min}$ is a value stored in register 326 and determined by laser and storage medium requirements.

Many lasers have discrete excitable states and accept pre-determined levels of driving current. In that case, the logic 324 converts values of ACCUM into allowable values of OVERDRIVE by accessing a look up table (LUT) 328 that contains the allowable values of OVERDRIVE indexed to ACCUM values. The thermal stability controller may contain one or both of the $I_{min}$ register 326 and the OVERDRIVE LUT 328. FIG. 3 depicts the LUT 328 in a dashed line since it is an additional embodiment.

Figure 4:
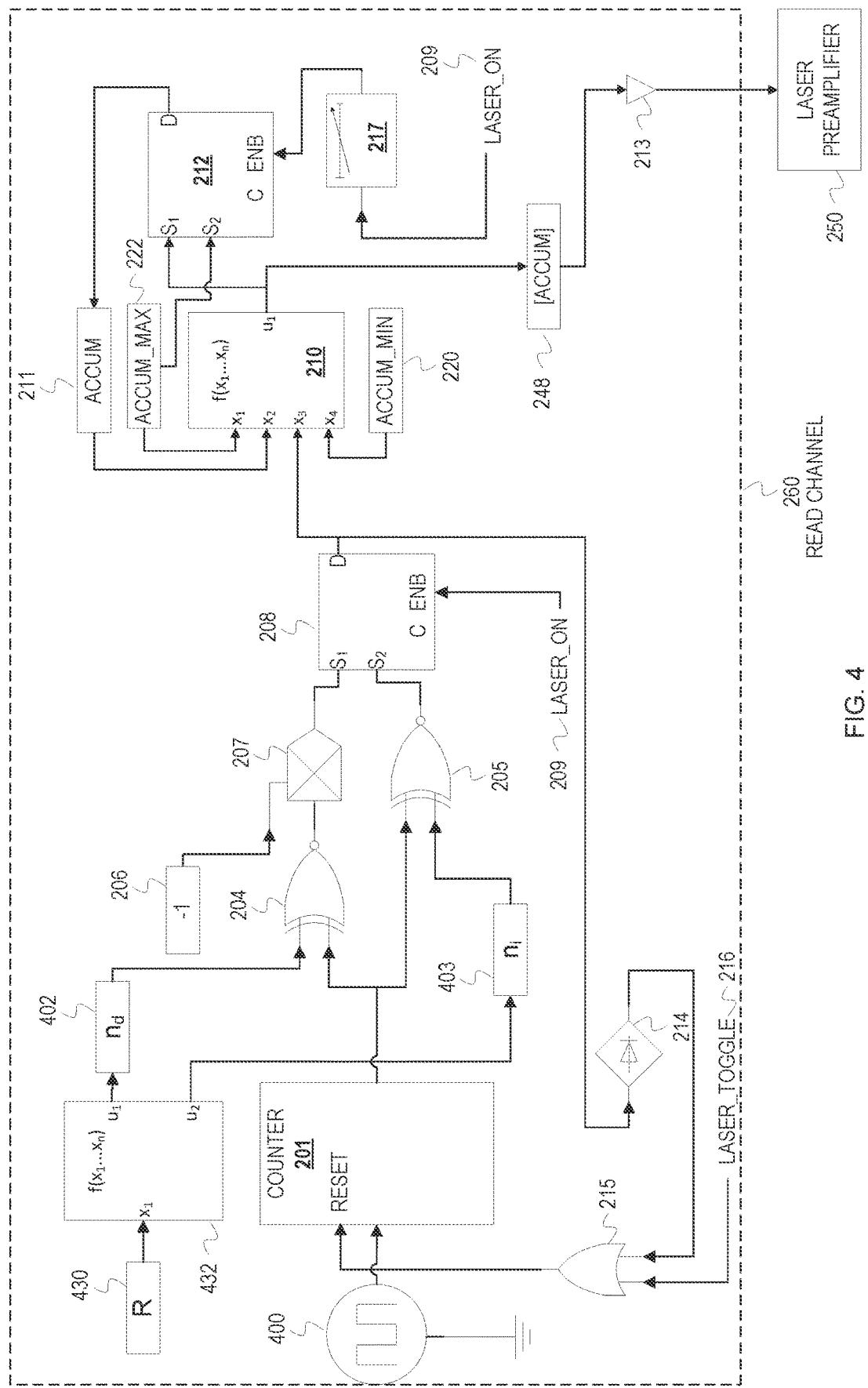
FIG. 4 is a diagram for an example thermal stability controller similar to that shown in FIG. 2 but in which a clock is variable rather than fixed.

FIG. 4 is a diagram for an example thermal stability controller similar to that shown in FIG. 2 but in which a clock 400 is variable rather than fixed. For example, a spinning disk storage medium may have a clock which is radially variable—that is clock frequencies associated with small radius and large radius write operations on the storage medium may vary which may be recovered in some examples from reading the storage medium. In order to use a variable clock associated with a spinning disk read data channel (RDC), a threshold $n_d$ stored in register 402 and a threshold $n_i$ stored in register 403 are dependent upon a further variable input, for example, stored in register 430. For example, the variable input to modify the threshold is taken to be a function of the radial position of the write head and referred to as "R." However, this variable R could also be a function of some other parameter such as disk rotational speed. The thresholds are modified based on the clock frequency because they are indicative of an absolute time, and clock count may vary for different clock frequencies. An arithmetic logic 432 calculates the values of $n_d$ and $n_i$ based on R from the register 430. The value of $n_d$ is then output to register 402 and the value of $n_i$ to register 403 to determine the respective thresholds.

Figure 5:
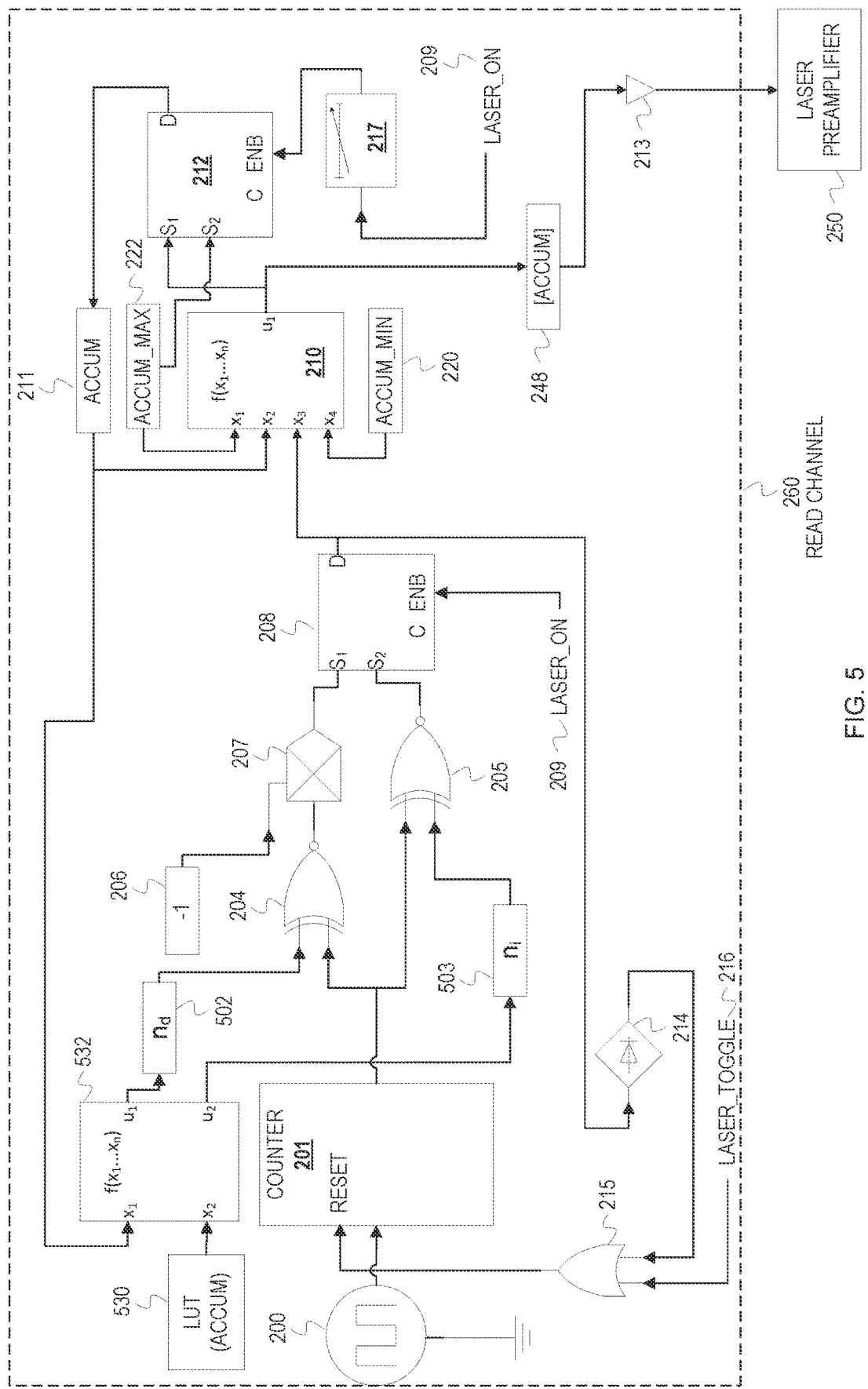
FIG. 5 is a diagram of an example thermal stability controller similar to that shown in FIG. 2 with additional components to calculate $n_d$ and $n_i$ as functions of the thermal compensation value.

FIG. 5 is a diagram of an example thermal stability controller similar to that shown in FIG. 2 with additional components to calculate $n_d$ and $n_i$ as functions of the thermal compensation value. In some examples, one or more components may be implemented as circuits. By introducing a dependence upon the thermal compensation value, it is possible to change the adjustment rate for very large and very small values of ACCUM. When the laser first turns on and is at ambient or cold temperature, quickly changing ACCUM can improve thermal stability. When the laser is heated to steady state and ACCUM approaches ACCUM_MIN, OVERDRIVE also approaches steady state and the ACCUM can be decreased at a slower rate or in a smaller step. The threshold $n_d$ can be logarithmically dependent upon ACCUM, such as $n_d = C^* \exp(-B^* ACCUM)$, with B and C chosen such that $n_d$ is positive and small when ACCUM is ACCUM_MAX and large when ACCUM is ACCUM_MIN. Similarly, the threshold $n_i$ can be dependent upon ACCUM but less sensitive to changes in ACCUM. For instance, the threshold can be calculated as $n_i = D^* \exp(F^* ACCUM)$, with D and F being fitting factors such that $n_i$ is smaller when ACCUM is near ACCUM_MIN and larger as it approaches ACCUM_MAX. Logarithmic or other such functions can be stored in a look up table 530. The thermal compensation value in register 211 is used to access the look up table 530 via a logical selector 532. The logical selector 532 then outputs the value of $n_d$ as calculated by the selected function to a register 502 and the selected value of $n_i$ to a register 503. The comparator 204 now checks the variable decrement threshold against the clock counter, while comparator 205 checks the variable increment threshold against the clock counter.

Figure 6:
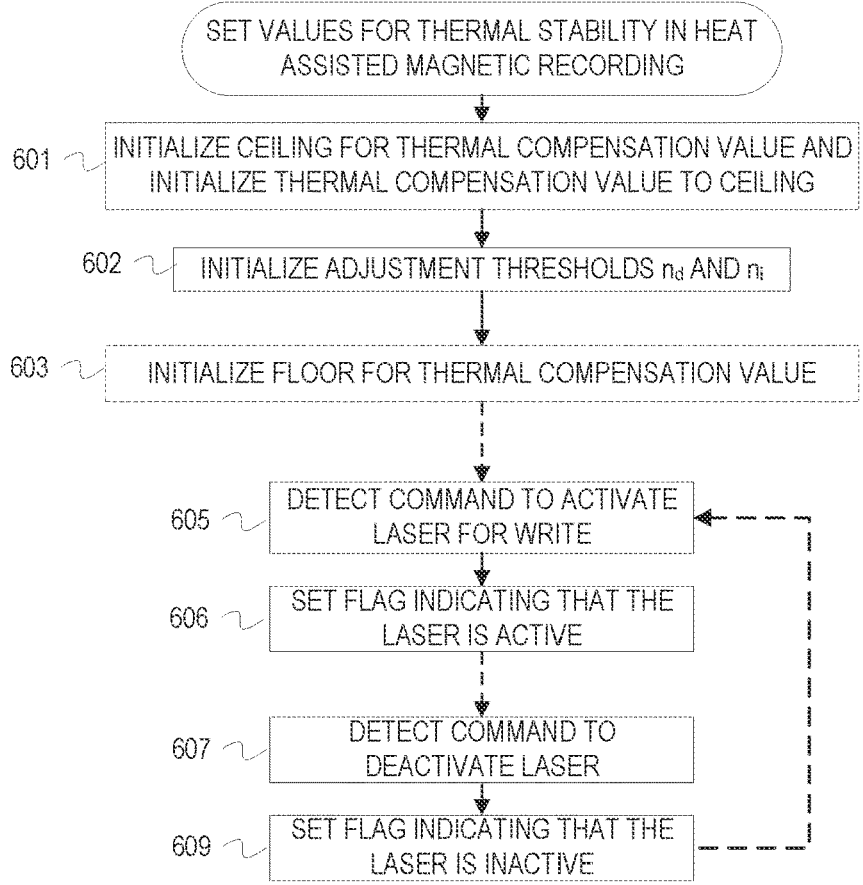
FIG. 6 is a flowchart of example operations for a laser controller in a storage drive to set values to stabilize the heated spot in heat assisted magnetic recording.

FIG. 6 is a flowchart of example operations for a laser controller in a storage drive to set values to stabilize the heated spot during write operations in heat assisted magnetic recording. The laser controller may include a microcontroller and program code to set values for thermal stability or be an application specific integrated circuit with program code to set value for thermal stability in heat assisted magnetic recording. Dashed lines between example operations in FIG. 6 indicate asynchronous flow of operations.

At startup or power on of a storage drive, the laser controller may initialize registers associated with a thermal compensation value. At block 601, the laser controller initializes a ceiling for a thermal compensation value and initializes the thermal compensation value to be the ceiling. As discussed previously, the ceiling for the thermal compensation value can be set to $I_{max}$ augmented with a priming buffer to avoid an immediate change in current for the laser. The thermal compensation value is initialized to the ceiling based on an assumption that the medium is at an ambient temperature since the storage drive is powering on or starting up. At block 602, the laser controller initializes the adjustment thresholds $n_d$ and $n_i$. At block 603, the laser controller can optionally initialize a floor for the thermal compensation value or rely on a 0 value for the floor.

The laser controller then sets a flag indicating operational state of the laser based on detection of activation commands and/or write requests. This flag corresponds to the control signals that indicate toggling of the laser and operational state of the laser which control duration measurement and regulate frequency of thermal compensation adjustment. At block 605, the laser controller detects a command to activate the laser for a write. This can be a signal or message from a storage drive controller. At block 606, the laser controller sets a flag indicating that the laser is active, which influences components to measure a heat duration and adjust the thermal compensation value according to the heat duration. The laser controller can set a bit in a register to 1. Logic can be coupled to the register to derive a laser toggle signal as well as a laser operational state (LASER_ON) control signal. For example, the output signal from setting the laser operational state bit can pass through a differentiator and then an absolute function component to create the laser toggle signal having a positive impulse whenever the operational state flag for the laser is changed.

When the laser is deactivated, the laser controller changes the operational state flag which triggers control signals to cause components to measure an inactive duration and adjust the thermal compensation value accordingly. At block 607, the laser controller detects a command to deactivate the laser. The deactivation command is detected based on the completion or interruption of the write. This may be indicated by the controller of the storage drive. At block 609, the laser controller sets a flag indicating that the laser is inactive in response to the detection of the deactivate command.

Figure 7:
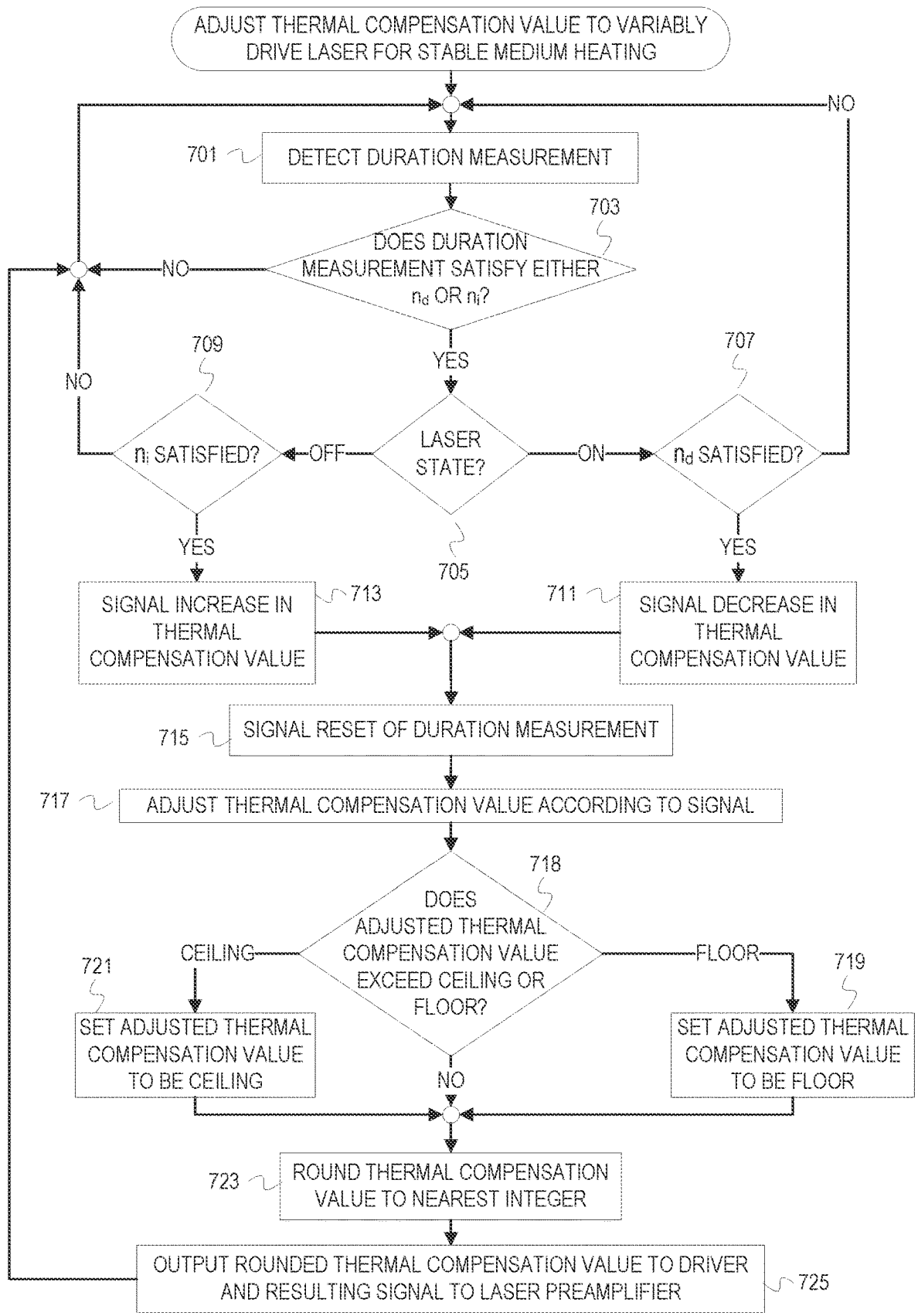
FIG. 7 is a flowchart of example operations for storage drive components to adjust a thermal compensation to variably drive a laser for stable medium heating.

FIG. 7 is a flowchart of example operations for storage drive components to adjust a thermal compensation to variably drive a laser for stable medium heating. As mentioned above, the storage drive components may be implemented in a read channel of a storage medium controller and provide an indication of the thermal compensation value to a laser preamplifier. Dashed lines between example operations in FIG. 7 indicate asynchronous flow of operations. Although the example operations are likely performed by components as described in the above example illustrations, the FIG. 7 description refers to a thermal stability controller for consistency with FIG. 1. The thermal stability controller can be implemented as one or more ASICs, as well as program code.

At block 701, the thermal stability controller detects a duration measurement. The duration measurement is either an active duration or inactive duration of the laser corresponding to a heating duration or a cooling duration. In examples, the duration measurement may be in increment of the clock associated with the storage drive controller.

At block 703, the thermal stability controller determines whether the duration measurement satisfies at least one of a cooling duration threshold ($n_i$) for increasing the thermal compensation value and a heating duration threshold ($n_d$) for decreasing the thermal compensation value. If the duration measurement satisfies at least one of the thresholds, then the flow continues to block 705. If the duration measurement satisfies neither of the thresholds, then the flow returns to block 701 to detect the next duration measurement.

At block 705, the thermal stability controller determines whether the laser is on or off. This can be determined based on reading a register that stores a laser operation state flag or based on a signal indicating operational state of the laser. If the laser is on, then the decrement path controls. If the laser is off, then the increment path controls. The thermal stability controller determines which of the thresholds was satisfied. At block 707, the thermal stability controller determines whether $n_d$ was satisfied by the duration measurement. If it was $n_d$ that was satisfied and the laser is on, then flow continues to block 711. At block 711, the thermal stability controller generates a signal to decrease the thermal compensation value. If $n_d$ was not satisfied and the laser is on, then the decrement path does not control and flow returns to block 701.

At block 709, the thermal stability controller determines whether $n_i$ was satisfied by the duration measurement. If it was $n_i$ that was satisfied and the laser is off, then flow continues to block 713. At block 713, the thermal stability controller generates a signal to increase the thermal compensation value. If $n_i$ was not satisfied and the laser is off, then flow returns to block 701.

If an adjustment of the thermal compensation value is signaled, then the duration measurement is reset at block 715. This conforms to the thresholds defining a period within a threshold that triggers an adjustment.

At block 717, the thermal stability controller adjusts the thermal compensation value according to the increment or decrement signal. The magnitude of adjustment can be static or dynamic. For instance, the adjustment can be an increment or decrement by a specific amount (e.g., 0.25). As another example, the adjustment can be a relative increment or decrement (e.g., decrement by 5% of the current thermal compensation value or increment by 10%).

Since the thermal compensation value is used to modulate the current for driving the laser, the modulation is bounded based on parameters tailored to the tolerances and components of a storage drive (e.g., by model). At block 718, the thermal stability controller determines whether the adjusted thermal compensation exceeds a ceiling or floor defined for the thermal compensation value. If the adjustment causes the thermal compensation value to exceed the ceiling, then the thermal stability controller sets the thermal compensation value to be the ceiling at block 721. If the adjustment causes the thermal compensation value to exceed the floor, then the thermal stability controller sets the thermal compensation value to be the floor at block 719.

At block 723, the thermal stability controller rounds the thermal compensation value to a nearest integer. This rounding can be implemented by selecting the n MSBs based on whether the thermal stability controller is communicating a current adjustment or a power level to the laser preamplifier.

At block 725, the thermal stability controller outputs the rounded thermal compensation value to the driver 213. The signal resulting from the driver outputs to a laser preamplifier. The driver can output via a specific pin that interfaces the thermal stability controller/read channel and the laser preamplifier.

Figure 8:
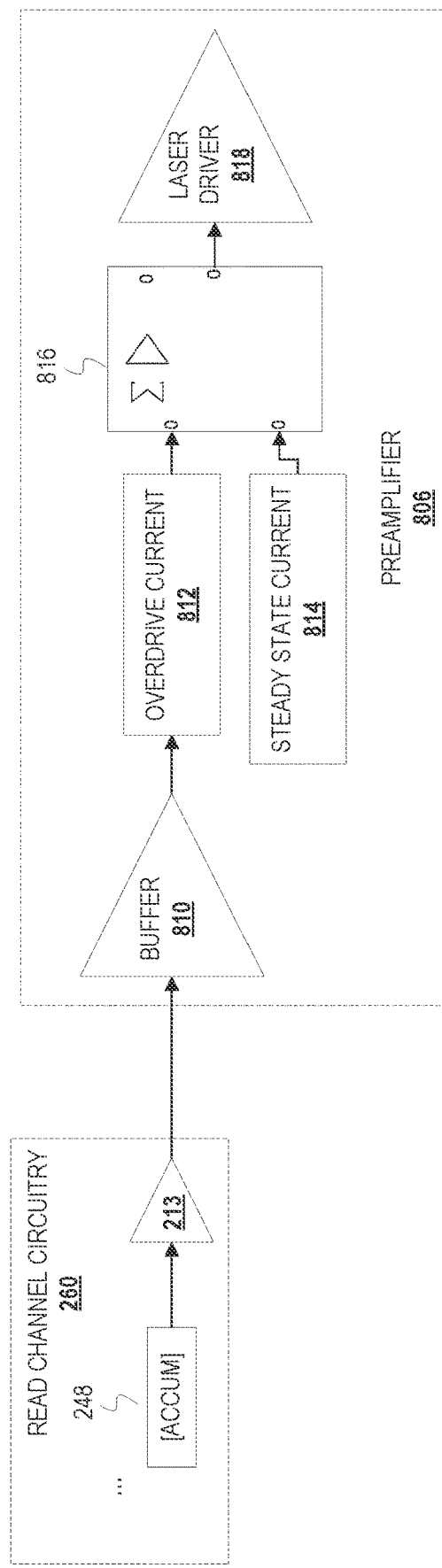
FIG. 8 depicts an example laser preamplifier coupled to receive a thermal compensation value from a read channel of a storage drive with heat assisted thermal recording.

FIG. 8 depicts an example laser preamplifier coupled to receive a thermal compensation value from a read channel of a storage drive with heat assisted thermal recording. FIG. 8 only depicts the last few components of the read channel 260 that feed into a laser preamplifier 806. The read channel 260 contains a digital clock that is faster than analog circuitry of the preamplifier 806. By storing the thermal compensation value in the register 248 within the read channel 260, the driver 213 may be run based on a precision and speed of the read channel 260. The driver current or voltage from the driver 213 is then fed into a preamplifier buffer 810 and generates a current value ("overdrive current") at the programmable amplifier 812. A steady state driving current of the laser is generated by an amplifier 814 that is driven at the slower speed of the preamplifier 806. The quickly changing overdrive current and the steady-state current are summed at the summer 816 and fed into a laser driver 818. The communication between the driver 213 and the buffer 710 in the preamplifier 806 is via a dedicated pin or multiplexed through existing pins. A dedicated pin or multiplex through existing pins is used to deliver the thermal compensation value because communicating the thermal adjustment value via a serial interface (SIF) would negate the time advantage gained by using the faster read channel clock. Leveraging the read channel clock facilitates a more accurate control of the laser for thermal stability over on and off durations than is possible if the functionality resided entirely within the preamplifier 806.

The term "component" as used herein may be interchangeable with the term registers, comparators, counters, accumulators, circuits, logic, among others, associated with performing the described functionalities. Additionally, the term "register" may include random access memory or read only memory. Further, the described functionalities including but not limited to the described components, registers, comparators, counters, accumulators, circuits, and logic can be implemented in hardware, software, circuits, or a combination thereof.

While the aspects of the disclosure are described with reference to various implementations and exploitations, it will be understood that these aspects are illustrative and that the scope of the claims is not limited to them. In general, techniques for time-based modulation of a laser current for thermal stability in heat assisted magnetic recording as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A system comprising:
   a driver configured to output a signal to a preamplifier of a heat source based on a thermal compensation value to cause the heat source to heat a spot on a storage medium; and
   a controller configured to adjust the thermal compensation value based on a duration for which the heat source is in an active or inactive operational state, the thermal compensation value indicative of a history of durations that the heat source was in the active or inactive operational state.

2. The system of claim 1, wherein the thermal compensation value indicates one of a power setting for the heat source and a current adjustment for the heat source.

3. The system of claim 1, wherein the controller is configured to:
determine whether the duration is (i) less than or equal to a first threshold or (ii) greater than or equal to a second threshold; and
increment or decrement the thermal compensation value in response to the duration being (i) less than or equal to the first threshold or (ii) greater than or equal to the second threshold, respectively.

4. The system of claim 3, wherein the first and second thresholds are based on a frequency of a variable clock associated with a write position on the storage medium.

5. The system of claim 3, wherein the first and second thresholds are based on the thermal compensation value.

6. The system of claim 1, wherein the controller comprises a register configured to store a predetermined number of most significant bits of the adjusted thermal compensation value to generate the signal.

7. The system of claim 1, further comprising a counter configured to count clock pulses of a clock in a read channel and indicate the duration based on a count of the clock pulses.

8. The system of claim 7, wherein the counter is reset in response to at least one of the heat source changing the operational state and the controller adjusting the thermal compensation value.

9. The system of claim 1, wherein the controller comprises:
a first comparator configured to compare the duration to a first threshold and to generate a first output in response to the duration being equal to the first threshold;
a second comparator configured to compare the duration to a second threshold and to generate a second output in response to the duration being equal to the second threshold; and
a first multiplexer configured to:
receive the first and second outputs;
receive a control signal indicating the operational state of the heat source; and
output an adjustment indication to increment, decrement, or not adjust the thermal compensation value;
wherein the controller is configured to adjust the thermal compensation value according to the adjustment indication.

10. The system of claim 1, wherein the controller is configured to control the adjusted thermal compensation value to not exceed a ceiling and a floor.

11. A storage drive comprising:
a preamplifier coupled to a heat source;
a read channel including:
a driver configured to output a signal to the preamplifier based on a thermal compensation value to drive the heat source to heat a spot on a storage medium; and
a controller configured to adjust the thermal compensation value based on a duration for which the heat source is in an active or inactive operational state, the thermal compensation value indicative of a history of durations that the heat source was in the active or inactive operational state; and
a write head configured to apply, while the spot is heated, a magnetic field to the heated spot to write data to the storage medium.

12. The storage drive of claim 11, wherein the preamplifier comprises:

an adder configured to add the signal from the driver with an indication of a steady state current for the heat source and to generate an output; and
a second driver configured to drive the heat source based on the output.

13. The storage drive of claim 11, wherein the preamplifier comprises:
a memory storing power settings for the heat source;
an adder configured to add the signal from the driver and a second signal indicating a steady state power setting for the heat source and to generate an output; and
a second driver configured to drive the heat source according to one of the power settings selected from the memory based on the output.

14. The storage drive of claim 11, wherein the read channel further comprises a counter configured to count clock pulses of a clock in the read channel and indicate the duration based on a count of the clock pulses.

15. A method comprising:
measuring a duration for which a heat source that heats a spot on a storage medium is in an active or inactive operational state;
adjusting a thermal compensation value based on the duration that the heat source is in the active or inactive operational state, the thermal compensation value indicative of a history of durations that the heat source was in the active or inactive operational state; and
driving the heat source based on the thermal compensation value to heat the spot on the storage medium.

16. The method of claim 15, further comprising applying a magnetic field indicative of data to be written to the spot on the storage medium while the spot is being heated.

17. The method of claim 15, further comprising:
determining whether the duration is (i) less than or equal to a first threshold or (ii) greater than or equal to a second threshold; and
incrementing or decrementing the thermal compensation value in response to the duration being (i) less than or equal to the first threshold or (ii) greater than or equal to the second threshold, respectively.

18. The method of claim 15, further comprising:
generating a signal based on a predetermined number of most significant bits of the adjusted thermal compensation value; and
driving the heat source based on the signal.

19. The method of claim 15, further comprising:
generating a first output in response to the duration being equal to a first threshold;
generating a second output in response to the duration being equal to a second threshold;
generating an adjustment indication to increment, decrement, or not adjust the thermal compensation value based on the first and second outputs and the operational state of the heat source; and
adjusting the thermal compensation value according to the adjustment indication.

20. The method of claim 15, further comprising controlling the adjusted thermal compensation value to not exceed a ceiling and a floor.

* * * * *